US011485837B2

(12) United States Patent
Kim et al.

(10) Patent No.: US 11,485,837 B2
(45) Date of Patent: Nov. 1, 2022

(54) POLYOLEFIN RESIN COMPOSITE MATERIAL AND METHOD OF PRODUCING THE SAME

(71) Applicant: FURUKAWA ELECTRIC CO., LTD., Tokyo (JP)

(72) Inventors: Jae Kyung Kim, Tokyo (JP); Eiji Kozawa, Tokyo (JP); Yasuo Nakajima, Tokyo (JP); Takeshi Yagi, Tokyo (JP)

(73) Assignee: FURUKAWA ELECTRONIC CO., LTD., Tokyo (JP)

( * ) Notice: Subject to any disclaimer, the term of this patent is extended or adjusted under 35 U.S.C. 154(b) by 118 days.

(21) Appl. No.: 16/571,957

(22) Filed: Sep. 16, 2019

(65) Prior Publication Data

US 2020/0010654 A1 Jan. 9, 2020

Related U.S. Application Data

(63) Continuation of application No. PCT/JP2018/009757, filed on Mar. 13, 2018.

(30) Foreign Application Priority Data

Mar. 29, 2017 (JP) .............................. JP2017-065481
Oct. 31, 2017 (JP) .............................. JP2017-210135

(51) Int. Cl.
*C08L 23/06* (2006.01)
*C08L 23/12* (2006.01)
*C08L 19/00* (2006.01)
*C08L 1/02* (2006.01)
*C08K 7/02* (2006.01)

(52) U.S. Cl.
CPC ................ *C08L 23/06* (2013.01); *C08K 7/02* (2013.01); *C08L 1/02* (2013.01); *C08L 19/00* (2013.01); *C08L 23/12* (2013.01); *C08L 2203/30* (2013.01)

(58) Field of Classification Search
CPC .......... C08L 23/06; C08L 23/12; C08L 19/00; C08L 1/02; C08K 7/02
USPC ......................................................... 524/27
See application file for complete search history.

(56) References Cited

U.S. PATENT DOCUMENTS

2014/0227605 A1    8/2014  Nakamura et al.
2016/0002461 A1*   1/2016  Tsujii ..................... C08F 293/00
                                                                523/351

FOREIGN PATENT DOCUMENTS

| EP | 3 604 424 A1 | 2/2020 |
| EP | 3 689 972 A1 | 8/2020 |
| JP | 8-267597 A | 10/1996 |
| JP | 2000-264974 A | 9/2000 |
| JP | 4013870 B2 | 11/2007 |
| JP | 2008-297364 A | 12/2008 |
| JP | 2009-167249 A | 7/2009 |
| JP | 2009167250 A * | 7/2009 |
| JP | 2010-89483 A | 4/2010 |
| JP | 2011-93990 A | 5/2011 |
| JP | 2011-116838 A | 6/2011 |
| JP | 2011-213966 A | 10/2011 |
| JP | 2011-219571 A | 11/2011 |
| JP | 2012-87199 A | 5/2012 |
| JP | 2012-102324 A | 5/2012 |
| JP | 2012-236906 A | 12/2012 |
| JP | 2013-56958 A | 3/2013 |
| JP | 2013-189574 A | 9/2013 |
| JP | 2015-183153 A | 10/2015 |
| JP | 2015-209439 A | 11/2015 |
| JP | 2016-94516 A | 5/2016 |
| JP | 2017-128717 A | 7/2017 |
| JP | 2017-145392 A | 8/2017 |
| JP | 2017-145393 A | 8/2017 |
| JP | 2017-155248 A | 9/2017 |

OTHER PUBLICATIONS https://www.automotiveplastics.com/automotive-plastics-today/interior/ (Year: 2010).*
Chinese Office Action and Search Report for corresponding Chinese Application No. 201880009893.2, dated Jun. 11, 2021, with English translation of the Office Action.
Japanese Notice of Reasons for Refusal for corresponding Japanese Application No. 2019-509210, dated Sep. 14, 2021, with an English translation.
International Search Report (PCT/ISA/210) issued in PCT/JP2018/009757, dated Jun. 12, 2018.
Written Opinion of the International Searching Authority (PCT/ISA/237) issued in PCT/JP2018/009757, dated Jun. 12, 2018.
Chinese Office Action for Chinese Application No. 201880070847.3, dated Jan. 19, 2022, with an English Machine Translation.
U.S. Office Action for U.S. Appl. No. 16/861,208, dated Mar. 21, 2022.
Chinese Office Action for corresponding Chinese Application No. 201880009893.2, dated Oct. 13, 2021, with an English translation.
English translation of the Written Opinion of the International Searching Authority (Form PCT/ISA/237) for International Application No. PCT/JP2018/040431, dated Jan. 22, 2019.
Extended European Search Report for European Application No. 18874930.3, dated Jun. 18, 2021.
U.S. Office Action for U.S. Appl. No. 16/861,208, dated May 7, 2021.
U.S. Office Action for U.S. Appl. No. 16/861,208, dated Sep. 22, 2021.
U.S. Appl. No. 16/861,208, filed Apr. 28, 2020.

(Continued)

*Primary Examiner* — Deve V Hall
(74) *Attorney, Agent, or Firm* — Birch, Stewart, Kolasch & Birch, LLP

(57) ABSTRACT

A polyolefin resin composite material, containing: a polyolefin resin; and 10 to 150 parts by mass of cellulose fibers with respect to 100 parts by mass of the polyolefin resin, wherein an area of aggregates of the cellulose fibers is less than 20,000 µm²; and a method of producing the same.

10 Claims, 1 Drawing Sheet

(56) References Cited

OTHER PUBLICATIONS

Chinese Decision of Rejection for corresponding Chinese Application No. 201880009893.2, dated Jan. 18, 2022, with an English translation.
Chinese Office Action dated Jul. 25, 2022 for corresponding CN Office Action 201880009893.2 with machine English Translation.
Communication Pursuant to Article 94(3) EPC, dated Aug. 18, 2022 in corresponding European Application No. 18776773.6.

* cited by examiner

COMPARATIVE EXAMPLE 1

Aggregate

Area 20,000 µm² or more

EXAMPLE 1

Optical Microscopy
(x50 times)

Image Processing
(measurement of area)

POLYOLEFIN RESIN COMPOSITE MATERIAL AND METHOD OF PRODUCING THE SAME

CROSS-REFERENCE TO RELATED APPLICATIONS

This application is a Continuation of PCT International Application No. PCT/JP2018/009757 filed on Mar. 13, 2018, which claims priority under 35 U.S.C. § 119 (a) to Japanese Patent Application No. 2017-065481 filed in Japan on Mar. 29, 2017 and Japanese Patent Application No. 2017-210135 filed in Japan on Oct. 31, 2017. Each of the above applications is hereby expressly incorporated by reference, in its entirety, into the present application.

TECHNICAL FIELD

The present invention relates to a polyolefin resin composite material and a method of producing the same.

BACKGROUND ART

Cellulose is a regenerable natural resource that is abundant on the earth. Cellulose has characteristics, such as light weight and high mechanical strength, and studies have been conducted to utilize cellulose as a reinforcing material for resins. Thus, attention has been paid to the possibility of the utilization.

For example, in Patent Literature 1, a production method of obtaining an aliphatic polyester composition having high mechanical strength and high rigidity, is described, the method including a step of subjecting a resin component formed from an aliphatic polyester; and a fibrous component formed from pulp and/or cellulosic fibers that have been treated with a particular preliminary treatment, to a melt-kneading treatment in the presence of a cellulose amorphous region swelling agent.

CITATION LIST

Patent Literatures

Patent Literature 1: Japanese Patent No. 4 013 870

SUMMARY OF INVENTION

Technical Problem

Cellulose fibers are highly hydrophilic, and therefore, it is considered that in the case of being mixed with a highly hydrophilic resin, cellulose fibers are likely to become compatible with the resin, and a composite material in which cellulose fibers are uniformly dispersed in a resin can be easily produced.

On the other hand, the affinity of cellulose fibers for a highly hydrophobic resin, such as a polyolefin resin, is insufficient, and even if a polyolefin resin and cellulose fibers are melt-kneaded, relatively large aggregates of cellulose fibers (also referred to as cellulose aggregates) are produced. That is, even when a polyolefin resin and cellulose fibers are melt-kneaded, it is difficult to obtain a resin composite material having cellulose fibers uniformly dispersed therein, in which a resin modification action of cellulose fibers has been sufficiently brought about.

Thus, the present invention is contemplated for providing a polyolefin resin composite material in which the size of cellulose aggregates is sufficiently small, and in which a polyolefin resin and cellulose are integrated with high uniformity.

Solution to Problem

The inventors of the present invention repeatedly conducted a thorough investigation, and as a result, the inventors have found that when a polyolefin resin and cellulose fibers are mixed at a predetermined ratio, and the mixture is melt-kneaded in the presence of water, the size of cellulose aggregates produced within a formed body thus obtainable can be sufficiently small, and as a result, the integrity of the polyolefin resin and the cellulose fibers can be increased. Further investigations have been repeatedly conducted based on these findings, and thus the present invention is to be completed.

The present invention is to provide the following means:
<1>0 A polyolefin resin composite material, comprising: a polyolefin resin; and 10 to 150 parts by mass of cellulose fibers with respect to 100 parts by mass of the polyolefin resin, wherein an area of aggregates of the cellulose fibers is less than 20,000 $\mu m^2$.
<2> The polyolefin resin composite material according to <1>, wherein the cellulose fibers are cellulose of plant fibers.
<3> The polyolefin resin composite material according to <1> or <2>, wherein the polyolefin resin is at least one of polyethylene, polypropylene, and an acrylonitrile/butadiene/styrene copolymer.
<4> A method of producing a polyolefin resin composite material, the method comprising: mixing a polyolefin resin, 10 to 150 parts by mass of cellulose fibers with respect to 100 parts by mass of the polyolefin resin, and water; and melt-kneading the resultant mixture.
<5> The method of producing a polyolefin resin composite material according to <4>, wherein a mixing amount of water in the melt-kneading is 1 to 150 parts by mass with respect to 100 parts by mass of the cellulose fibers.
<6> The method of producing a polyolefin resin composite material according to <4> or <5>, wherein an area of aggregates of the cellulose fibers produced in the polyolefin resin composite material thus obtainable is less than 20,000 $\mu m^2$.

Effects of Invention

The polyolefin resin composite material of the present invention is a resin material in which cellulose aggregates in the composite material have a sufficiently small size and are highly uniformly dispersed. According to the method of producing a polyolefin resin composite material of the present invention, the size of the cellulose aggregates produced in the composite material can be made sufficiently small, and a polyolefin resin composite material can be obtained, in which the polyolefin resin and the cellulose fibers are integrated with high uniformity.

Other and further features and advantages of the invention will appear more fully from the following description, appropriately referring to the accompanying drawings.

BRIEF DESCRIPTION OF THE DRAWINGS

FIG. 1(a) is an image of pellets of a polyolefin resin composite material obtained in Comparative Example 1, which was taken according to a method of calculating an area of cellulose aggregates that will be described below; and FIG. 1(b) is an image obtained by processing the image of FIG. 1(a) for the determination of the area of cellulose aggregates. Furthermore, FIG. 1(c) is an image of pellets of a polyolefin resin composite material obtained in Example 1, which was taken according to the method of calculating the area of cellulose aggregates that will be described below; and FIG. 1(d) is an image obtained by processing the image of FIG. 1(c) for the determination of the area of cellulose aggregates.

Figure 1A:
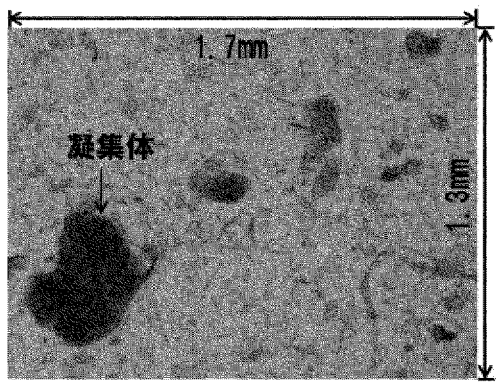
FIGS. 1(a) to 1(d) are images taken by the "method of measuring an area of cellulose aggregates" in the below ['Examples' section].

MODE FOR CARRYING OUT THE INVENTION (Polyolefin Resin Composite Material)

The polyolefin resin composite material of the present invention includes at least 10 to 150 parts by mass of cellulose fibers with respect to 100 parts by mass of a polyolefin resin, and the area of cellulose aggregates present in the composite material is less than 20,000 μm$^2$ (twenty thousand μm$^2$). The area of cellulose aggregates according to the present invention does not mean the surface area of the cellulose aggregates, but means the area of cellulose aggregates as viewed in planar view, which is measured by spreading out the polyolefin resin composite material to a predetermined thickness and observing the polyolefin resin composite material in planar view, as will be described below.

Hereinafter, the components that are to be used for the polyolefin resin composite material of the present invention will be described.

—Polyolefin Resin—

The polyolefin resin is a resin formed by polymerizing at least one olefin, and the polyolefin resin may be a homopolymer, or may be a copolymer.

According to the present invention, the term olefin is used in a broad sense. That is, in addition to an unsubstituted hydrocarbon compound having a carbon-carbon double bond, a case in which the hydrocarbon compound having a carbon-carbon double bond further has a substituent.

Examples of such an olefin include α-olefins having 4 to 12 carbon atoms, including ethylene, propylene, isobutylene, and isobutene (1-butene); butadiene, isoprene, a (meth) acrylic acid ester, (meth)acrylic acid, (meth)acrylamide, vinyl alcohol, vinyl acetate, vinyl chloride, styrene, and acrylonitrile.

Examples of the α-olefins having 4 to 12 carbon atoms described above include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene.

An olefin homopolymer refers to a polymer of one kind of olefin.

Furthermore, an olefin copolymer refers to a copolymer of a certain olefin and another olefin different from that olefin. The olefin copolymer is preferably a copolymer having an unsubstituted hydrocarbon compound having a carbon-carbon double bond as a constituent component. A polyolefin resin is preferably such that the constituent components of the resin are composed of unsubstituted hydrocarbon compounds having carbon-carbon double bonds.

Examples of the polyolefin resin include a polyethylene resin, a polypropylene rein, a polyisobutylene resin, a polyisobutene resin, a polyisoprene resin, a polybutadiene resin, a (meth)acrylic resin (so-called acrylic resin), a vinyl resin such as a polyvinyl chloride resin, a poly(meth)acrylamide resin, a polystyrene resin, an acrylonitrile/butadiene/styrene copolymer resin (ABS resin), an ethylene/(meth)acrylic acid ester copolymer, and an ethylene/vinyl acetate copolymer.

Among these resins, a polyethylene resin, a polypropylene resin, and an acrylonitrile/butadiene/styrene copolymer resin (ABS resin) are preferred, and a polyethylene resin and a polypropylene resin among those are more preferred.

Examples of the polyethylene resin include an ethylene homopolymer and an ethylene/α-olefin copolymer. Preferred examples of the α-olefin include 1-butene, 1-pentene, 1-hexene, and 1-octene.

Examples of the ethylene/α-olefin copolymer include an ethylene/1-butene copolymer, an ethylene/1-pentene copolymer, an ethylene/1-hexene copolymer, and an ethylene/1-octene copolymer.

In addition, in the case of classifying the resins according to the density or shape, use may be made of: any polyethylene resin selected from a high-density polyethylene (HDPE), a low-density polyethylene (LDPE), a very low-density polyethylene (VLDPE), a linear low-density polyethylene (LLDPE), and an ultra high-molecular weight polyethylene (UHMW-PE).

Examples of the polypropylene resin include a propylene homopolymer, a propylene/ethylene random copolymer, a propylene/α-olefin random copolymer, a propylene/ethylene/α-olefin copolymer, and a propylene block copolymer (formed from a propylene homopolymer component or a copolymer component composed mainly of propylene, and a copolymer obtainable by copolymerizing at least one monomer selected from ethylene and an α-olefin with propylene). These polypropylene resins may be used singly, or two or more kinds thereof may be used in combination.

The α-olefin to be used for the polypropylene resin is preferably 1-butene, 1-pentene, 1-hexene, 4-methyl-1-pentene, 1-octene, or 1-decene; and more preferably 1-butene, 1-hexene, or 1-octene.

Examples of the propylene/α-olefin random copolymer include a propylene/1-butene random copolymer, a propylene/1-hexene random copolymer, and a propylene/1-octene random copolymer.

Examples of the propylene/ethylene/α-olefin copolymer include a propylene/ethylene/1-butene copolymer, a propylene/ethylene/1-hexene copolymer, and a propylene/ethylene/1-octene copolymer.

Examples of the propylene block copolymer include a (propylene)/(propylene/ethylene) copolymer, a (propylene)/(propylene/ethylene/1-butene) copolymer, a (propylene)/(propylene/ethylene/1-hexene) copolymer, a (propylene)/(propylene/1-butene) copolymer, a (propylene)/(propylene/1-hexene) copolymer, a (propylene/ethylene)/(propylene/ethylene) copolymer, a (propylene/ethylene)/(propylene/ethylene/1-butene) copolymer, a (propylene/ethylene)/(propylene/ethylene/1-hexene) copolymer, a (propylene/ethylene)/(propylene/1-butene) copolymer, a (propylene/ethylene)/(propylene/1-hexene) copolymer, a (propylene/1-butene)/(propylene/ethylene) copolymer, a (propylene/1-butene)/(propylene/ethylene/1-butene) copolymer, a (propylene/1-butene)/(propylene/ethylene/1-hexene) copolymer, a (propylene/1-butene)/(propylene/1-butene) copolymer, and a (propylene/1-butene)/(propylene/1-hexene) copolymer.

Among these polypropylene resins, a propylene homopolymer, a propylene/ethylene random copolymer, a propylene/1-butene random copolymer, a propylene/ethylene/1-butene copolymer, and a propylene block copolymer are preferred.

The crystallinity of the polypropylene resin can be determined from the melting temperature (melting point) or stereoregularity, and is regulated according to the product quality required from the polyolefin resin composite material of the present invention or the product quality required from a formed article obtainable by forming the polyolefin resin composite material of the invention.

Incidentally, stereoregularity is referred to as isotactic index or syndiotactic index.

The isotactic index can be determined by the $^{13}$C-NMR method described in Macromolecules, Vol. 8, p. 687 (1975). Specifically, the isotactic index of a polypropylene resin is determined, as an area fraction of the mmmm peak among all of absorption peaks in the carbon region of methyl group in a $^{13}$C-NMR spectrum.

A high isotactic index means high crystallinity, and the crystallinity is preferably 0.96 or higher, more preferably 0.97 or higher, and even more preferably 0.98 or higher.

Meanwhile, the syndiotactic index can be determined by the method described in J. Am. Chem. Soc., 110, 6255 (1988) or Angew. Chem. Int. Ed. Engl., 1955, 34, 1143-1170, and a high syndiotactic index means high crystallinity.

According to the present invention, the polyolefin resin may be a modified polyolefin resin, or may include a modified polyolefin resin in a polyolefin resin that is not modified.

The modified polyolefin resin may be a product obtained by graft-modifying a polyolefin resin with an unsaturated carboxylic acid or a derivative thereof. Examples of the unsaturated carboxylic acid include maleic acid, fumaric acid, itaconic acid, acrylic acid, and methacrylic acid. Examples of the unsaturated carboxylic acid derivative include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester, and fumaric acid dimethyl ester. Among these unsaturated carboxylic acids and/or derivatives thereof, preferred are glycidyl esters of acrylic acid and methacrylic acid, and maleic anhydride.

Examples of the acrylic resin include a homopolymer or a copolymer of an acrylic monomer, such as (meth)acrylic acid, a (meth)acrylic acid ester, or acrylonitrile; and a copolymer of an acrylic monomer and another monomer.

Among these, examples of the (meth)acrylic acid ester include (meth)acrylic acid alkyl esters each having an alkyl group having 1 to 10 carbon atoms, such as methyl (meth)acrylate, ethyl (meth)acrylate, propyl (meth)acrylate, butyl (meth)acrylate, and 2-ethylhexyl (meth)acrylate; hydroxyalkyl (meth)acrylates, such as hydroxyethyl (meth)acrylate; and (meth)acrylic acid glycidyl esters.

Specific examples of the homopolymer or copolymer of an acrylic monomer include, for example, a poly(meth)acrylic acid ester, an acrylic acid ester/methacrylic acid ester copolymer, and polyacrylonitrile. Specific examples of the copolymer of an acrylic monomer and another monomer include, for example, a (meth)acrylic acid ester/styrene copolymer, a (meth)acrylic acid/styrene copolymer, an acrylonitrile/butadiene/styrene copolymer, an acrylonitrile/styrene copolymer, and an acrylonitrile/styrene/(meth)acrylic acid ester copolymer.

Examples of the vinyl resin include a vinyl chloride resin [a homopolymer of a vinyl chloride monomer (a polyvinyl chloride resin or the like), a copolymer of a vinyl chloride monomer and another monomer (a vinyl chloride/vinyl acetate copolymer, a vinyl chloride/(meth)acrylic acid ester copolymer, or the like), or the like], a vinyl alcohol resin (a homopolymer of polyvinyl alcohol, or the like; a copolymer, such as an ethylene/vinyl alcohol copolymer, or the like), and a polyvinyl acetal resin, such as polyvinyl formal. These vinyl-based resins can be used singly or may be used in combination of two or more kinds thereof.

The melt flow rate (MFR) of the polyolefin resin is usually 0.01 to 400 g/10-minutes, and from the viewpoint of increasing mechanical strength and production stability, the melt flow rate is preferably 0.1 to 400 g/10-minutes, and more preferably 0.5 to 200 g/10-minutes.

Incidentally, unless particularly specified otherwise, the MFR is the mass (g/10-minutes) of the polymer flowing out per 10 minutes at 190° C. under a load of 2.16 kg, according to JIS K7210.

—Cellulose Fibers—

The cellulose fibers to be used for the present invention are fibrous cellulose, and since methods for industrial utilization thereof have been established, and cellulose fibers can be easily obtained, cellulose of plant fibers is preferred, while fine plant fibrous cellulose (powdery pulp) is preferred in particular.

Pulp is a material that becomes a raw material for paper, and contains tracheids extracted from plants as a main component. From a chemical viewpoint, the main component is polysaccharides, and a main component thereof is cellulose.

The cellulose of plant fibers is not particularly limited; but, examples include plant-derived celluloses obtainable from wood, bamboo, hemp, jute, kenaf, farm crop waste (for example, straw of grain (e.g. barley), rice, and the like; stalks of maize, cotton, and the like; and sugarcane), cloth, regenerated pulp, old paper, wood meal, and the like. According to the present invention, wood or wood-derived materials are preferred, wood meal is more preferred, and kraft pulp is particularly preferred.

Incidentally, kraft pulp is a generic name of pulp obtained by removing lignin/hemicelluloses from wood or a plant raw material by a chemical treatment with caustic soda or the like, and extracting nearly pure cellulose.

In the present invention, such cellulose fibers are melt-kneaded with a polyolefin resin in the co-presence of water, formation of cellulose aggregates having an area of 20,000 µm$^2$ is suppressed thereby, and uniform dispersion of cellulose fibers in a polyolefin resin composite material is to be realized. Meanwhile, the upper limit of the area of the cellulose aggregates is preferably 14,000 µm$^2$ or less. Furthermore, the lower limit of the area of the cellulose aggregates is preferably 500 µm$^2$ or more.

When the area of cellulose aggregates is small, it is implied that aggregates of cellulose fibers is prevented, and cellulose fibers are dispersed more uniformly. This means that the reinforcement efficiency of the polyolefin resin is high.

Cellulose of plant fibers is such that 30 to 40 molecules are bundled together and form highly crystalline microfibrils having an ultrafine width, with a diameter of about 3 nm and a length of several hundred nanometer (nm) to several dozen micrometers (µm), and these microfibrils form a bundled structure, with soft non-crystalline portions interposed therebetween. The powdered cellulose (powdery pulp) to be used as a raw material of the present invention is this fascicular aggregate.

The content of the cellulose fibers in the polyolefin resin composite material of the present invention is 10 to 150 parts by mass with respect to 100 parts by mass of the polyolefin resin.

When the content of the cellulose fibers is less than 10 parts by mass, it is difficult to obtain sufficient action for modification of the resin by the cellulose fibers. In contrast, when the content is more than 150 parts by mass, there is a risk that cellulose aggregates having an area of 20,000 μm$^2$ or more may be formed.

The area of the cellulose aggregates is determined by the method described in the section of Examples.

—Other Components—

In the polyolefin resin composite material of the present invention, in addition to the above-described components, other components, such as an oxidation inhibitor, a photostabilizer, a radical scavenger, an ultraviolet absorber, a colorant (a dye, an organic pigment, or an inorganic pigment), a filler, a slip agent, a plasticizer, a processing aid(, such as an acryl processing aid), a foaming agent, a lubricating agent(, such as paraffin wax), a surface treating agent, a nucleating agent, a mold release agent, a hydrolysis inhibitor, an anti-blocking agent, an antistatic agent, an antifogging agent, an antifungal agent, an ion-trapping agent, a flame retardant, and a flame retardant aid, which can be incorporated as appropriate to the extent that does not impair the purpose described above.

Examples of the oxidation inhibitor and deterioration inhibitor include a phenolic oxidation inhibitor, a phosphorus-based oxidation inhibitor, a sulfur-based oxidation inhibitor, a hydroxylamine-based oxidation inhibitor, and an amine-based oxidation inhibitor, and as the phenolic oxidation inhibitor, preferred is a hindered phenolic compound having a t-alkyl group at the ortho-position.

Examples of the phenolic oxidation inhibitor include tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethylene glycol-N-bis-3-(3-t-butyl-5-methyl-4-hydroxyphenyl)propionate, 1,6-hexanediol bis[3-(3,5-di-t-butyl-4-hydroxyphenyl) propionate], and 2,2-thiobis-diethylenebis[3-(3,5-di-t-butyl-4-hydroxyphenyl)propionate]. More preferred examples include 3,9-bis[2-{3-(3-t-butyl-4-hydroxy-5-methylphenyl) propionyloxy}-1,1-dimethylethyl]-2,4,8,10-tetraoxaspiro [5.5]undecane, lauryl-3,5-t-butyl-4-hydroxybenzoate, palmityl-3,5-t-butyl-4-hydroxybenzoate, stearyl-3,5-t-butyl-4-hydroxybenzoate, behenyl-3,5-t-butyl-4-hydroxybenzoate, 2,4-di-t-butyl-phenyl-3,5-di-t-butyl-4-hydroxybenzoate, and tocopherols.

Examples of the phosphorus-based oxidation inhibitor include tris(nonylphenyl) phosphite, tris(2,4-di-t-butylphenyl) phosphite, distearylpentaerythritol diphosphite, bis(2, 4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis (2,4-dicumylphenyl)pentaerythritol diphosphite, tetrakis(2, 4-di-t-butylphenyl)-4,4'-diphenylene diphosphonite, 2,2'-methylenebis(4,6-di-t-butylphenyl) 2-ethylhexyl phosphite, 2,2'-ethylidenebis(4,6-di-t-butylphenyl) fluorophosphite, bis (2,4-di-t-butyl-6-methylphenyl) ethylphosphite, 2-(2,4,6-tri-t-butylphenyl)-5-ethyl-5-butyl-1,3,2-oxaphospholinane, 2,2',2'-nitrilo[triethyl-tris(3,3',5,5'-tetra-t-butyl-1,1'-biphenyl-2,2'-diyl) phosphite, and 2,4,8,10-tetra-t-butyl-6-[3-(3-methyl-4-hydroxy-5-t-butylphenyl)propoxy]dibenzo[d, f][1,3,2]dioxaphosphepine.

Examples of the sulfur-based oxidation inhibitor include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and bis[2-methyl-4-(3-n-alkyl(alkyl having 12 to 14 carbon atoms) thiopropionyloxy)-5-t-butylphenyl] sulfide.

Examples of the photostabilizer include a hindered amine photostabilizer having a molecular weight of 1,000 or more (a photostabilizer having a 2,2,6,6-tetramethylpiperidine skeleton in the molecule).

Examples of the ultraviolet absorber include a benzotriazole-based compound, a triazine-based compound, a benzophenone-based compound, a salicylate-based compound, a cyanoacrylate-based compound, and a nickel-based compound.

Examples of the colorant include carbon black, an inorganic pigment, and an organic pigment. Examples of the carbon black include furnace black, channel black, acetylene black, and lamp black. Examples of the inorganic pigment include iron black, Bengal red, titanium oxide, cadmium red, cadmium yellow, ultramarine blue, cobalt blue, titanium yellow, red lead, yellow lead, and Prussian blue. Examples of the organic pigment include quinacridone, polyazo yellow, anthraquinone yellow, polyazo red, azo lake yellow, perylene, phthalocyanine green, phthalocyanine blue, and isoindolinone yellow. These colorants may be used singly or may be used in combination of two or more kinds thereof.

Preferred examples of the filler include silica, hydroxyapatite, alumina, titania, boehmite, talc; and a metal compound, such as calcium carbonate.

(Method of Producing a Polyolefin Resin Composite Material)

The method of producing a polyolefin resin composite material of the present invention includes melt-kneading 100 parts by mass of a polyolefin resin and 10 to 150 parts by mass of cellulose fibers in the presence of water. Thereby, production of cellulose aggregates having an area of 20,000 μm$^2$ or more is suppressed, and a polyolefin resin composite material can be obtained, in which cellulose fibers are more uniformly dispersed. The incorporation amount of water is preferably set to 1 to 225 parts by mass with respect to 100 parts by mass of the polyolefin resin, and it is preferable that the incorporation amount of water is set to 1 to 150 parts by mass with respect to 100 parts by mass of the cellulose fibers, from the viewpoints of dispersibility, processability, and the like of the cellulose fibers.

Furthermore, in regard to the method of producing a polyolefin resin composite material of the present invention, in order to further enhance the dispersibility of the cellulose fibers, the ratio of the mixing amount of the cellulose fibers and the mixing amount of water (mixing amount of cellulose fibers:mixing amount of water) is preferably 1:0.01 to 1.5, and more preferably 1:0.36 to 1.5.

In regard to the melt-kneading in the method of producing a polyolefin resin composite material of the present invention, the order of mixing the polyolefin resin, the cellulose fibers, and water is not particularly limited. The polyolefin resin and the cellulose fibers may be mixed first and melt-kneaded, and then water is added, followed by that the resultant mixture may be further kneaded. Alternatively, the polyolefin resin, the cellulose fibers, and water may all be introduced into a processing machine, and then the resultant mixture may be melt-kneaded. Furthermore, the cellulose fibers and water is kneaded, and then the polyolefin resin is added thereto, and the resultant mixture may be melt-kneaded.

This kneading processing step is preferably such that kneading in a processing machine is performed in a stage of processing and forming by extrusion, intrusion, or the like.

Polyolefin resins are highly hydrophobic, and when water is added in melt-kneading of a polyolefin resin, intended uniform kneading may be hindered, such as in the case of slipping of the resin. Therefore, in melt-kneading of a polyolefin resin, it is usually not necessary to add water.

On the contrary to this, in the method of producing a polyolefin resin composite material of the present invention, water is added in melt-kneading of the polyolefin resin, and thereby, production of cellulose aggregates having an area of 20,000 µm² is suppressed. The reason for this is not certain; however, it is assumed that water added in melt-kneading swells cellulose and accelerates micronizing of cellulose fibers, these micronized cellulose fibers are integrated with water and have an action on the polyolefin, and uniform melt-kneading of the polyolefin resin and cellulose is enabled.

Regarding the temperature of melt-kneading, it is desirable that a temperature at which thermal decomposition of the cellulose fibers does not easily occur is set to the upper limit. Therefore, the upper limit temperature is preferably 300° C. or lower, more preferably 250° C. or lower, and even more preferably 230° C. or lower. The lower limit is practically higher by 10° C. or more than the melting point of the polyolefin resin.

With regard to stirring in melt-kneading, it is preferable that a screw configuration capable of securing sufficient kneadability is combined by disposing appropriate kneading discs in the screw axis direction or the like, and kneading is performed at a speed of screw rotation at which a necessary production amount can be obtained (usually, in the range of about 100 to 300 rpm).

An apparatus of performing kneading and processing is preferably an apparatus of co-directional twin-screw system, and, for example, mentioned may be made of: a twin-screw extruder [KZW15TW-45MG-NH (trade name), manufactured by TECHNOVEL CORPORATION].

However, the apparatus is not limited to a co-directional twin-screw extruder, and any system, such as a single-screw extruder, a two-directional twin-screw extruder, a multi-screw extruder having three or more screws, or a batch type kneading machine (kneader, Banbury, or the like), may be used as long as sufficient kneadability is obtained, and effects similar to in the present invention are obtained.

Examples of the use application of the polyolefin resin composite material of the present invention include materials for vehicles, such as automobiles and autobikes; structural members of a robot arm, robot components for amusement, prosthetic limb members, electric appliance materials, OA equipment casings, construction material members, drainage facilities, toiletry materials, various tanks, containers, seats, toys, and sports goods.

Examples of the materials for vehicles include interior decoration parts, such as door trim board, pillar, instrumental panel, console, rocker panel, armrest, door inner panel, spare tire cover, and doorknob; exterior decoration parts, such as bumper, spoiler, fender, side step, and door outer panel; other parts for air intake duct, coolant reserve tank, radiator reserve tank, window cleaning solution tank, fender liner, and fan; and integral forming components, such as front end panel.

EXAMPLES

The present invention will be described in more detail based on examples given below, but the invention is not meant to be limited by these.

—Materials to be Used—

Materials to be used will be described below.

(1) Polyolefin resin

High-density polyethylene [MFR=5 g/10-minutes (190° C./2.16 kg), density=0.953 g/cm³]

Polypropylene [MFR=9 g/10-minutes (230° C./2.16 kg), density=0.900 g/cm³]

(2) Cellulose fibers

Cellulose A: KC FLOCK W-200 [trade name, manufactured by Nippon Paper Industries Co., Ltd., powdered cellulose having an average particle size of about 32 µm]

Cellulose B: LIGNOCEL C-120 [trade name, manufactured by J. Rettenmaier & Sons GmbH + Co. KG, an average particle size 70 to 150 µm]

Example 1

A polyolefin resin composite material was produced by the following steps.

While a polyolefin resin was being fed into a twin-screw extruder [KZW15TW-45MG-NH (trade name), manufactured by TECHNOVEL CORPORATION] at an outlet temperature of 190° C. at a speed (rate) of 1,000 g/hour, cellulose A was fed by a second feeder at a speed of 110 g/hour. Water was fed by a liquid adding pump at a speed of 98 g/hour, and the resultant mixture that satisfied the composition of the following Table 1 was melt-kneaded at 200° C. Then, the thus-kneaded product was extruded, to obtain a polyolefin resin composite material. The speed of screw rotation in the melt-kneading was set to 100 rpm. The percentage water content of the polyolefin resin composite material thus obtained was 0.9% by mass.

Examples 2 to 14 and Comparative Examples 1 to 4

Polyolefin resin composite materials of Examples 2 to 14 and Comparative Examples 1 to 4 were obtained in the same manner as in Example 1, except that the compositions of the following Table 1 were employed.

In Comparative Example 3, the incorporation amount of water was too large, the amount sent out by the extruder was unstable, and a polyolefin resin composite material could not be obtained.

For each of the polyolefin resin composite materials obtained in Examples and Comparative Examples described above, the area of cellulose aggregates produced in the composite material was calculated as follows.

(Method of Calculating an Area of Cellulose Aggregates)

A polyolefin resin composite material thus obtained was spread out such that the area in a planar view would be 36 times the original area, and then the area of cellulose aggregates in the planar view was measured. A more detailed explanation will be given below.

A polyolefin resin composite material thus obtained was made into rectangular parallelepiped pellets each having a length of 3.3 mm×a width of 4.3 mm×a thickness of 3.6 mm. Using those pellets, a sheet of measurement having a thickness of 0.1 mm was produced. Specifically, the pellets were preheated for 5 minutes at 160° C. using a press apparatus, and then the pellets were compressed under a pressure of 20 MPa at 160° C. for 5 minutes, thus to produce a sheet of measurement.

The sheet thus produced was observed in a planar view using an industrial microscope "ECLIPSE LV100ND (trade name)", manufactured by NIKON CORPORATION at a magnification ratio of 50 times. Images of this observed surface were captured and processed, parts counted at a luminance of 0 to 80 were designated as cellulose aggregates, and the area of the parts was calculated.

Figure 1B:
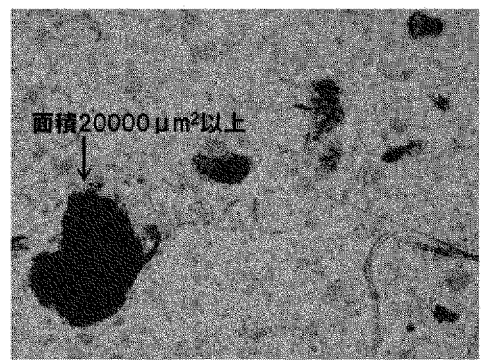
Figure 1C:
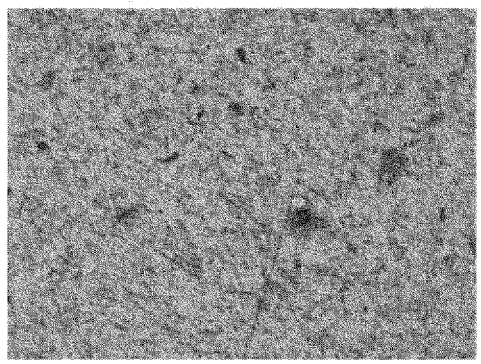
Figure 1D:
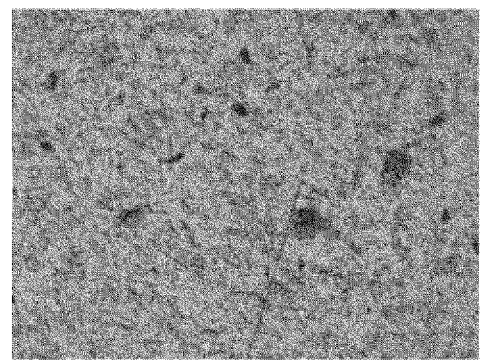

Specifically, a visual field was set to a size of 1.3 mm×1.7 mm, and nine visual fields were randomly imaged. Images thus obtained were processed by "NIS-Elemenets D (trade name)" manufactured by NIKON CORPORATION under the following conditions, and the respective areas of parts counted at a luminance of 0 to 80 were calculated. The largest area and the smallest area among them were designated as the maximum value and the minimum value of the For the pellets of the polyolefin resin composite materials obtained in Comparative Example 1 and Example 1, images captured according to the above-described method and images processed to measure areas are shown in FIGS. 1(a), 1(b), 1(c), and 1(d).

(Tensile Modulus)

The polyolefin resin composite material pellets obtained as described above were dried for 24 hours at 80° C., and a tensile test specimen was produced according to specimen type No. 2 of JIS K7127 using an injection forming machine [ROBOTSHOT α-30C, manufactured by FANUC CORPORATION].

The tensile modulus (GPa) of the tensile test specimen produced as described above was measured, according to JIS K7161, using a tensile testing machine [Instron Testing Machine Model 5567, manufactured by Instron Corp.], under the conditions of a test speed of 1.0 mm/min.

TABLE 1

|  |  | Ex 1 | Ex 2 | Ex 3 | Ex 4 | Ex 5 | Ex 6 | Ex 7 | Ex 8 | Ex 9 |
|---|---|---|---|---|---|---|---|---|---|---|
| High-density polyethylene | | 100 | 100 | 100 | 100 | 100 | 100 | 100 | 100 | 100 |
| Polypropylene | | — | — | — | — | — | — | — | — | — |
| Cellulose | A | 10 | 10 | 10 | 10 | 10 | 10 | 25 | 50 | 75 |
| | B | — | — | — | — | — | — | — | — | — |
| Water | | 15 | 10 | 8.2 | 6.2 | 3.6 | 0.1 | 25 | 50 | 75 |
| Area of aggregates ($\mu m^2$) | Max | 10,619 | 112,881 1,880 | | 12,987 | 13,564 | 18,039 | 10,171 | 10,553 | 11,071 |
| | Min | 503 | 506 | 502 | 502 | 505 | 503 | 502 | 503 | 501 |
| Tensile modulus (GPa) | | 1.34 | 1.32 | 1.3 | 1.29 | 1.27 | 1.25 | 1.68 | 2.14 | 2.71 |

|  |  | Ex 10 | Ex 11 | Ex 12 | Ex 13 | Ex 14 | C Ex 1 | C Ex 2 | C Ex 3 | C Ex 4 |
|---|---|---|---|---|---|---|---|---|---|---|
| High-density polyethylene | | 100 | 100 | 100 | 100 | — | 100 | 100 | 100 | 100 |
| Polypropylene | | — | — | — | — | 100 | — | — | — | — |
| Cellulose | A | 150 | 150 | 150 | — | 10 | 10 | 200 | 100 | 5 |
| | B | — | — | — | 10 | — | — | — | — | — |
| Water | | 1.5 | 150 | 225 | 10 | 15 | — | 100 | 250 | 5 |
| Area of aggregates ($\mu m^2$) | Max | 18,814 | 12,113 | 10,991 | 11,230 | 10,312 | 144,374 | 23,411 | — | 11,911 |
| | Min | 502 | 502 | 503 | 501 | 503 | 504 | 502 | — | 501 |
| Tensile modulus (GPa) | | 4.12 | 4.39 | 4.42 | 1.33 | 1.98 | 1.18 | 1.21 | — | 1.05 |

Note:
'Ex' means example according to this invention; and
'C Ex' means Comparative Example.

areas of cellulose aggregates. However, a part having an area of less than 500 $\mu m^2$ was excluded from the object of measurement. It is because when non-aggregating cellulose fibers that were used as a raw material were measured by a method such as described above, the area was about 500 $\mu m^2$, and for any size below this value, it was not acknowledged as a resultant formed by aggregates of cellulose fibers.
—Image Processing Conditions—
Smooth off
A function of acting on the shape of edges of an object, and thereby smoothing the shape.
Clean on
A function of hiding small objects. Since only small objects disappear, other images are not affected. In this measurement, since areas smaller than 500 $\mu m^2$ are excluded, objects having an area of less than 500 $\mu m^2$ were removed by the cleaning function.
Bury closed region off
A function of burying closed regions within an object.
Partition off
A function of detecting a combined single object, and separating the same.
The results thus obtained are summarized in the following Table 1.

<Notes in Table>
The unit for the values in the rows of polyolefin resin, celluloses A and B, and water is parts by mass, and the symbol "–" represents that water is unused, that is, 0 parts by mass.

The symbol "–" in the "Area of aggregates" of Comparative Example 3 means that a composite material in which cellulose fibers and a polyolefin resin are integrated could not be obtained.

As can be seen from Table 1 described above, with regard to the polyolefin resin composite materials of Examples 1 to 14, the areas of cellulose aggregates were all less than 20,000 $\mu m^2$ (each of which means excellent), and the mechanical characteristics (tensile modulus) were also excellent.

Contrary to the above, the polyolefin resin composite material of Comparative Example 1 was produced without using water at the time of kneading, and the areas of cellulose aggregates exceeded 20,000 $\mu m^2$. Regarding the polyolefin resin composite material of Comparative Example 2, 200 parts by mass of cellulose was used with respect to 100 parts by mass of the polyolefin resin, and the area of aggregates exceeded 20,000 $\mu m^2$. Furthermore, in Comparative Example 3, a composite material in which cellulose fibers and a polyolefin resin were integrated could not be obtained. Meanwhile, in Comparative Example 4, since the incorporation amount of cellulose was too small, a highly rigid composite material could not be obtained.

As such, it can be seen that on the occasion of melt-kneading particular amounts of a polyolefin resin and cellulose, by adding a particular amount of water, the size of cellulose aggregates can be suppressed to be less than 20,000 $\mu m^2$, and a resin composite material can be obtained, in which the polyolefin resin and the cellulose fibers were integrated with high uniformity.

With the polyolefin resin composite material of the present invention obtained in this manner, the resin modifying action of cellulose fibers can be sufficiently brought out; light weight, high rigidity, low coefficient of linear thermal expansion, and the like, can be realized; and the external appearance is also excellent.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2017-065481 filed in Japan on Mar. 29, 2017 and Patent Application No. 2017-210135 filed in Japan on Oct. 31, 2017, each of which is entirely herein incorporated by reference.

The invention claimed is:

1. A polyolefin resin composite material, comprising:
   a polyolefin resin; and
   10 to 150 parts by mass of cellulose fibers with respect to 100 parts by mass of the polyolefin resin,
   wherein an area of aggregates of the cellulose fibers is 500 $\mu m^2$ or more and less than 20,000 $\mu m^2$.

2. The polyolefin resin composite material as claimed in claim 1, wherein the cellulose fibers are cellulose of plant fibers.

3. The polyolefin resin composite material as claimed in claim 1, wherein the polyolefin resin is at least one of polyethylene, polypropylene, and an acrylonitrile/butadiene/styrene copolymer.

4. A method of producing a polyolefin resin composite material, the method comprising:
   mixing a polyolefin resin, 10 to 150 parts by mass of cellulose fibers with respect to 100 parts by mass of the polyolefin resin, and water, and
   melt-kneading the resultant mixture,
   wherein an area of aggregates of the cellulose fibers in the polyolefin resin composite material is 500 $\mu m^2$ or more and less than 20,000 $\mu m^2$.

5. The method of producing a polyolefin resin composite material as claimed in claim 4, wherein a mixing amount of water in the melt-kneading is 1 to 150 parts by mass of cellulose fibers with respect to 100 parts by mass of the celluose fibers.

6. The method of producing a polyolefin resin composite material as claimed in claim 4, wherein an area of aggregates of the cellulose fibers produced in the polyolefin resin composite material thus obtainable is 500 $\mu m^2$ or more and 14,000 $\mu m^2$ or less.

7. A formed article, which is formed from the polyolefin resin composite material as claimed in claim 1.

8. The formed article as claimed in claim 7, whose use application is materials for vehicles.

9. The formed article as claimed in claim 7, wherein the formed article is a door trim board, pillar, instrumental panel, console, rocker panel, armrest, door inner panel, spare tire cover, doorknob, bumper, spoiler, fender, side step, door outer panel, parts for air intake duct, coolant reserve tank, radiator reserve tank, window cleaning solution tank, fender liner, fan, or front end panel.

10. The formed article as claimed in claim 7, wherein the polyolefin resin is melt-kneaded with the cellulose fibers in the presence of water.

* * * * *